United States Patent
Bezard et al.

[11] Patent Number: 5,291,338
[45] Date of Patent: Mar. 1, 1994

[54] HEAD-DOWN TYPE OPTICAL DEVICE FOR DELIVERING INFORMATION TO THE DRIVER OF A MOTOR VEHICLE

[75] Inventors: Jean-Jacques Bezard, Chatou; Alain Bonutto, Herblay; Catherine Jury, Courbevoie, all of France

[73] Assignee: Jaeger, Levallois - Perret, France

[21] Appl. No.: 778,108

[22] PCT Filed: Dec. 13, 1991

[86] PCT No.: PCT/FR90/00429
§ 371 Date: Feb. 11, 1992
§ 102(e) Date: Feb. 11, 1992

[87] PCT Pub. No.: WO90/16004
PCT Pub. Date: Dec. 27, 1990

[30] Foreign Application Priority Data

Jun. 15, 1989 [FR] France ................................ 8907950
Nov. 29, 1989 [FR] France ................................ 8915712
Mar. 8, 1990 [FR] France ................................ 9002961

[51] Int. Cl.⁵ .............................................. G02B 5/10
[52] U.S. Cl. ...................................... 359/859; 359/843; 359/634; 180/90; 280/771
[58] Field of Search ............... 359/853, 859, 896, 843, 359/609, 634, 70; 180/90; 280/771

[56] References Cited
U.S. PATENT DOCUMENTS

| | | | |
|---|---|---|---|
| 3,697,154 | 10/1972 | Johnson | 359/859 |
| 3,707,325 | 12/1972 | Hardeman et al. | 359/859 |
| 3,946,827 | 3/1976 | Cadiou | 180/90 |
| 4,294,515 | 10/1981 | Kaufman | 359/634 |
| 4,763,990 | 8/1988 | Wood | 359/634 |
| 4,836,651 | 6/1989 | Anderson | 359/54 |
| 4,962,998 | 10/1990 | Iino | 359/843 |
| 5,059,956 | 10/1991 | Iino | 359/843 |

FOREIGN PATENT DOCUMENTS

| | | |
|---|---|---|
| 8714769 | 4/1988 | Fed. Rep. of Germany . |
| 2624295 | 6/1989 | France . |
| 8808146 | 10/1988 | PCT Int'l Appl. . |
| 8902611 | 3/1989 | PCT Int'l Appl. . |
| 2166899 | 5/1986 | United Kingdom . |

OTHER PUBLICATIONS

Patent Abstracts of Japan vol. 11, No. 84 (P-556) [2531] Mar. 1987 S. Okabayashi "Display Device for Vehicle".

*Primary Examiner*—Loha Ben
*Attorney, Agent, or Firm*—Stevens, Davis, Miller & Mosher

[57] ABSTRACT

The invention relates to an optical device providing information to the driver of a motor vehicle, which includes a concave mirror (100), located below the lowered line of vision within the field of vision of the exterior, its concavity being directed towards the driver, and an imager (200) designed to direct a light signal to the mirror (100), characterized by the fact that the concave mirror (100) is defined by an O-dome.

21 Claims, 9 Drawing Sheets

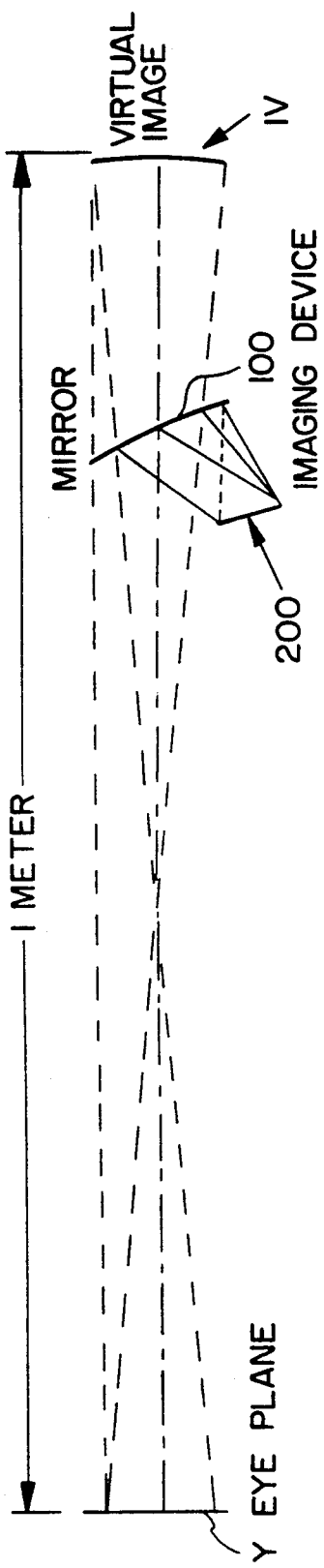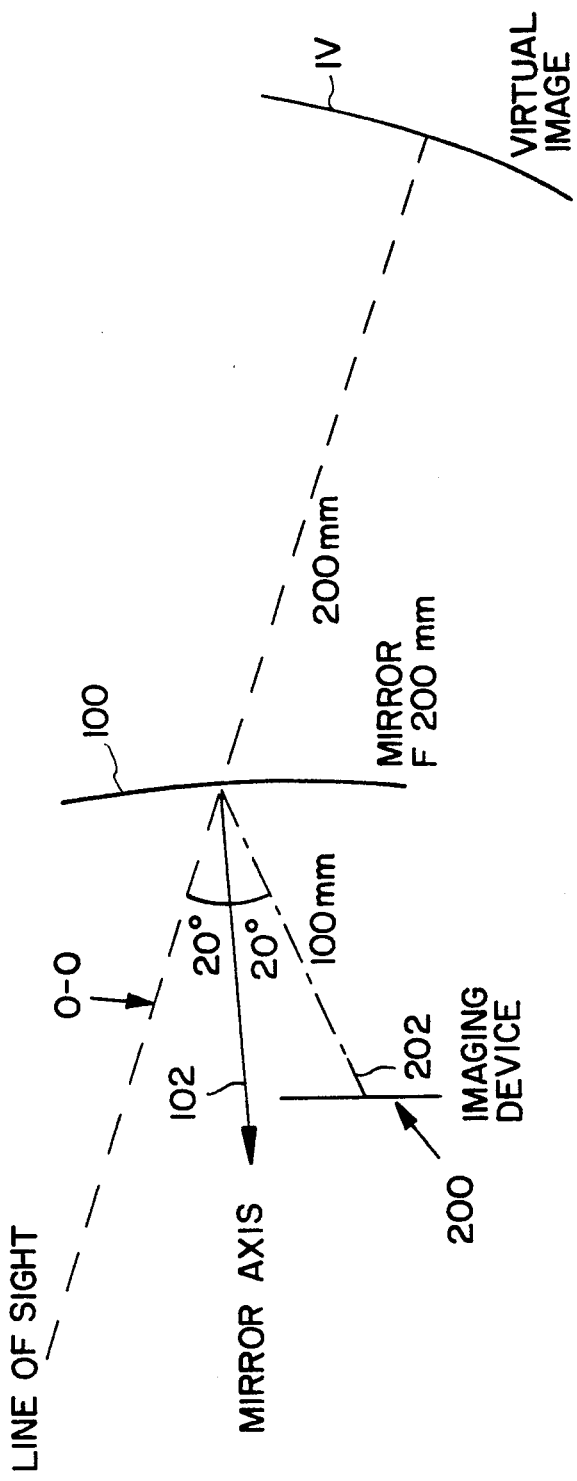

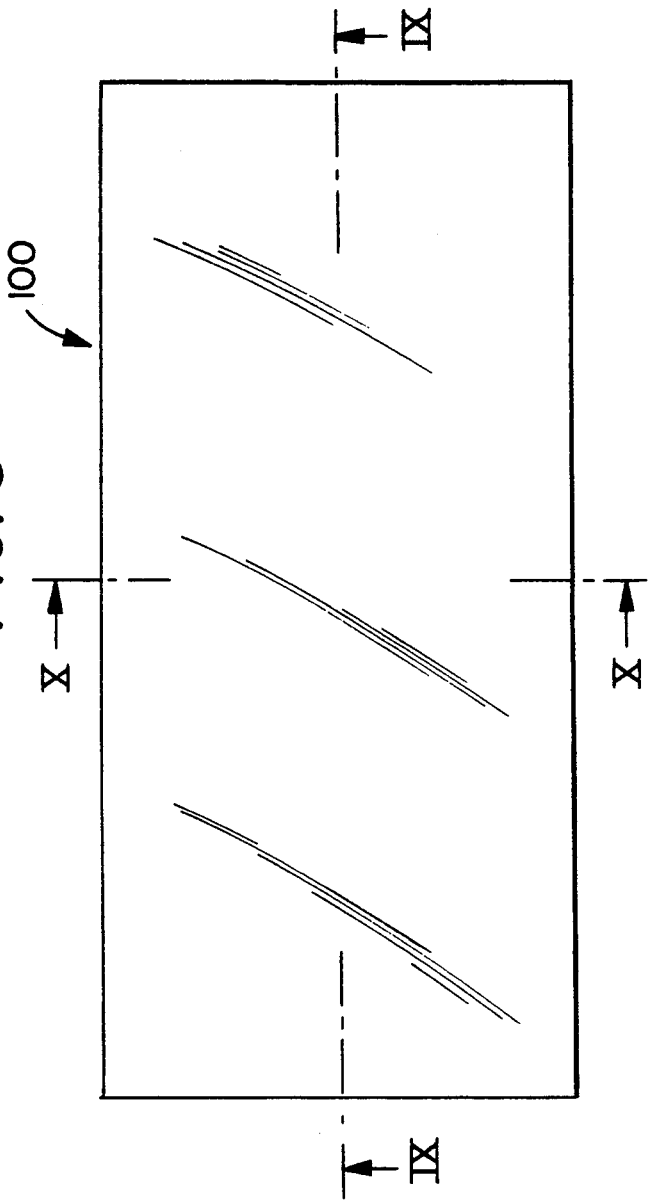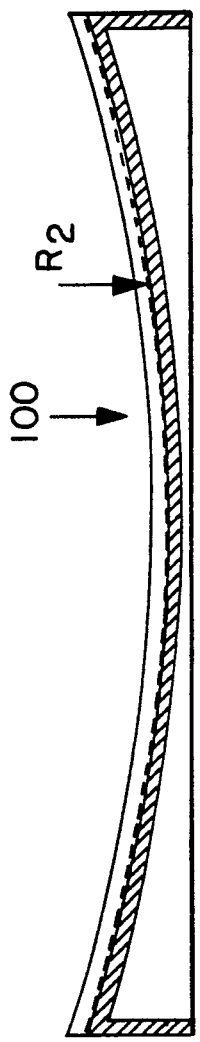

HEAD-DOWN TYPE OPTICAL DEVICE FOR DELIVERING INFORMATION TO THE DRIVER OF A MOTOR VEHICLE

BACKGROUND OF THE INVENTION

The present invention relates to a head-down type optical device designed to deliver information to the driver of a motor vehicle.

Numerous devices have already been proposed for delivering optical information to the driver of a motor vehicle. For example, indicator lamps and instruments having moving pointers have been in use for a long time. More recently, light-emitting displays and liquid crystal displays have been proposed.

These tend to be preferred nowadays, in particular for reasons of appearance. However, their cost is often prohibitive when the display is to be large in size.

Systems of the so-called "head-down display" type are known in the field of aviation. The purpose of these systems is to project information to infinity or to a great distance in an equipment field of view situated immediately below the bottom line of view in the landscape field of view, without superposing information on the landscape. "Head-down display" type systems make it possible to acquire the projected information appreciably more quickly since they limit the accommodation or convergence that is required when passing from landscape to information.

However, the head-down type systems proposed for aviation are generally complex and expensive.

Proposals have also been made, for example in Document WO-A-8902611 for head-down type display systems that provide information to the driver of a motor vehicle.

However, the system described in Document WO-A-8902611 is also quite complex. In particular, it comprises a display associated with a source of illumination by means of a bundle of optical fibers.

The system described in Document WO-A-8902611 has not, as yet, given rise to an application in the field of motor vehicles.

SUMMARY OF THE INVENTION

An object of the present invention is to propose a novel optical device for delivering information to the driver of a motor vehicle while eliminating the drawbacks of prior devices.

According to the present invention, this object is achieved by an optical device for delivering information to the driver of a motor vehicle, the device comprising a concave mirror placed below the bottom line of view in the landscape field of view, the concave side of the mirror facing the driver, and an imaging device designed to direct a light signal towards the mirror, wherein the concave mirror is defined by a portion of the surface of a torus, and the device includes means for adjusting its pointing direction about a horizontal axis.

The system proposed by the present invention is simple, robust, reliable, and cheap.

It enables any driver to adapt to it quickly even if the driver is not familiar with sophisticated systems.

In addition, because of the magnification provided by the concave mirror, it makes it possible to use an imaging device of small size. This disposition is advantageous because it reduces to cost of the display. It also makes an appreciable space saving possible.

According to an advantageous characteristic of the present invention, the light signal from the imaging device is directed towards the concave mirror by an auxiliary return mirror.

According to another characteristic of the present invention, the display is of the static type, e.g. of the LCD type, and a connector for connecting the display to a power supply and information-generating circuit is placed on one of the vertical sides of the display.

This characteristic makes it possible to make maximum use of the height-limited space available in the passenger compartment where the display set must be installed between the top face of the steering column and the bottom of the windshield. It is thus possible to make a display whose effective height is practically equal to the available height.

According to another advantageous characteristic of the present invention, the display device is of the static type and connectors for connecting the display to a power supply and information-generating circuit are placed on each of the vertical sides of the display.

According to another advantageous characteristic of the present invention, an integrated electronic circuit serving at least to drive the display is disposed on a vertical side area of one of the transparent members of the display. More precisely, and preferably, a display-driving integrated electronic circuit is provided on each of the vertical side areas of the display outside the area used for displaying symbols.

According to another characteristic of the present invention, the display device comprises various mutually sloping plane components whose positions relative to the mirror are optimized to generate a deformation-free image.

According to another advantageous characteristic of the present invention, an indicator device is provided on each plane component of the display divide.

Other characteristics, objects, and advantages of the present invention appear on reading the following detailed description made with reference to the accompanying drawings given by Way of nonlimiting example.

BRIEF DESCRIPTION OF THE DRAWINGS

FIG. 2 is a diagrammatic vertical section showing the essential components of an optical device of the present invention;

FIG. 3 is a detail view of the device;

FIG. 8 is a front view of a concave mirror in accordance with the present invention;

FIG. 9 is a diagrammatic horizontal section through the same mirror on a section plane referenced IX—IX in FIG. 8;

accompanying

DESCRIPTION OF THE PREFERRED EMBODIMENT

Figure 1:
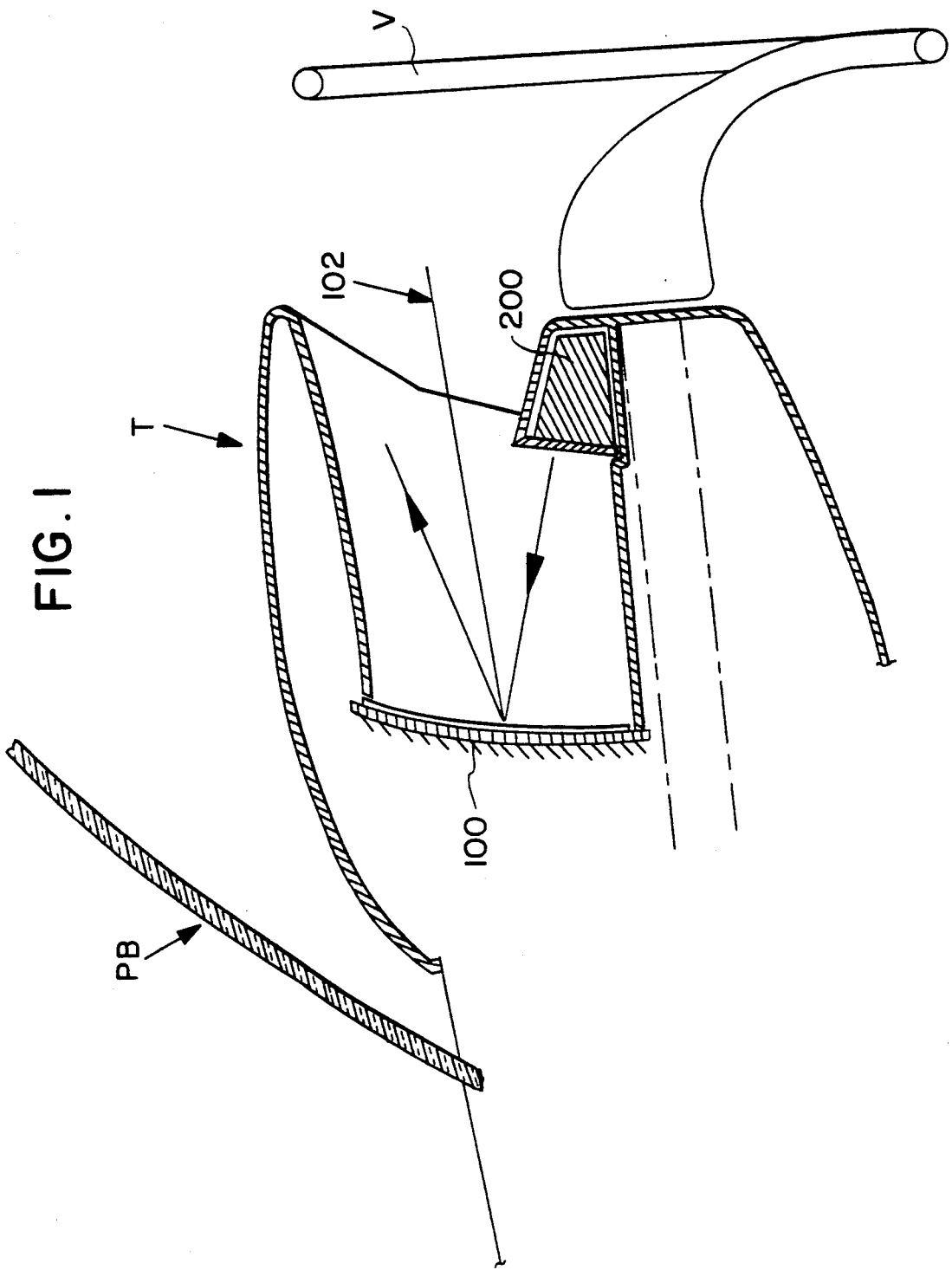
FIG. 1 is a diagrammatic vertical section showing how a device of the present invention is installed.

Accompanying FIG. 1 shows the basic structure of an optical device in accordance with the present invention.

Accompanying FIG. 1 shows portions of the windshield PB, the steering wheel V, and the visor of a dashboard T of a motor vehicle. The optical device of the present invention is integrated in the dashboard T. It comprises a concave mirror 100 and an imaging device 200.

The concave side of the concave mirror 100 faces the observer, i.e. towards the back of the vehicle. The imaging device 200 is directed towards the mirror, i.e. towards the front of the motor vehicle. More precisely, the imaging device 200 is placed behind the steering wheel V. The observer sees the virtual image of the imaging device 200 in the mirror 100 as illustrated in FIG. 2, for example.

In FIG. 2, IV designates the virtual image of the imaging device as provided by the mirror, and Y designates the plane of the observer's eyes.

The optical axis 102 of the mirror is preferably substantially parallel to the longitudinal axis of the vehicle, and at a slight slope to the horizontal, going up towards the back of the vehicle.

As shown in FIGS. 2 and 3, the concave mirror 100 preferably has a focal length of about 200 mm. It is advantageously placed at a distance of about 80 cm from the ideal observer eye plane Y, such that the virtual image IV is placed at about 1 meter (m) from the plane Y.

The axis 202 of the light beam emitted by the imaging device 200 towards the concave mirror 100 is symmetrical to the line of sight O—O of the observer about the axis 102 of the mirror. The orientation of the mirror 100 and of the imaging device 200 is preferably such that the line of sight O—O slopes at about 20° relative to the axis 102 of the mirror. The same applies to the axis 202 of the imaging device relative to the axis 102 cf the mirror. The imaging device 200 is also preferably placed about 100 mm from the mirror 100.

Figure 4:
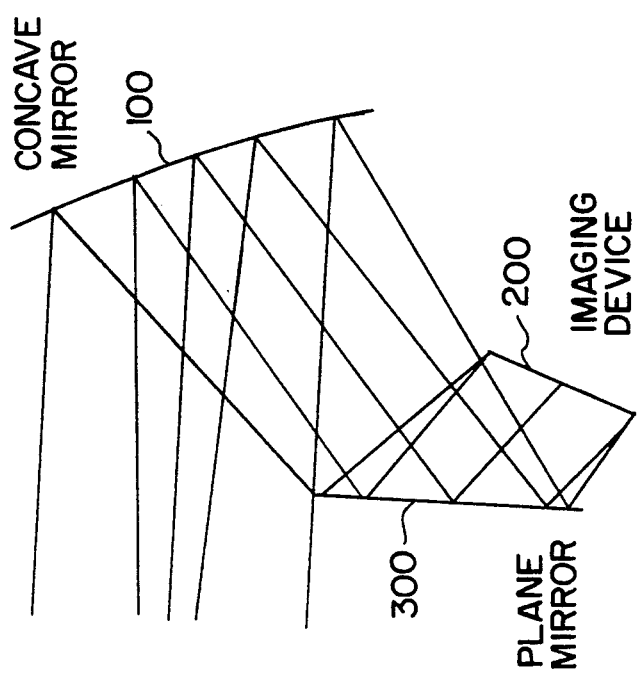
FIG. 4 is a fragmentary view of a variant embodiment of the optical device of the present invention with a return mirror.

As shown in FIG. 4, the bulk of the device can be reduced by deflecting the light signal generated by the imaging device 200 towards the concave mirror 100 by means of a return mirror 300. In the configuration shown in FIG. 4, the return mirror 300 is a substantially vertical plane mirror extending transversely to the longitudinal axis of the vehicle The return mirror 300 may be of various different shapes.

Thus, in the configuration given in FIG. 4, the optical device comprises a concave mirror 100 whose concave side faces the observer, i.e. the back of the vehicle, a return mirror 300 whose reflecting face the front of the vehicle, i.e. it faces the concave mirror 100, and an imaging device 200 which faces the plane mirror 300. i.e. towards the back of the vehicle.

It may be observed that the virtual image IV given by the concave mirror 100 is deformed relative to the real image of the imaging device 200.

Figure 5:
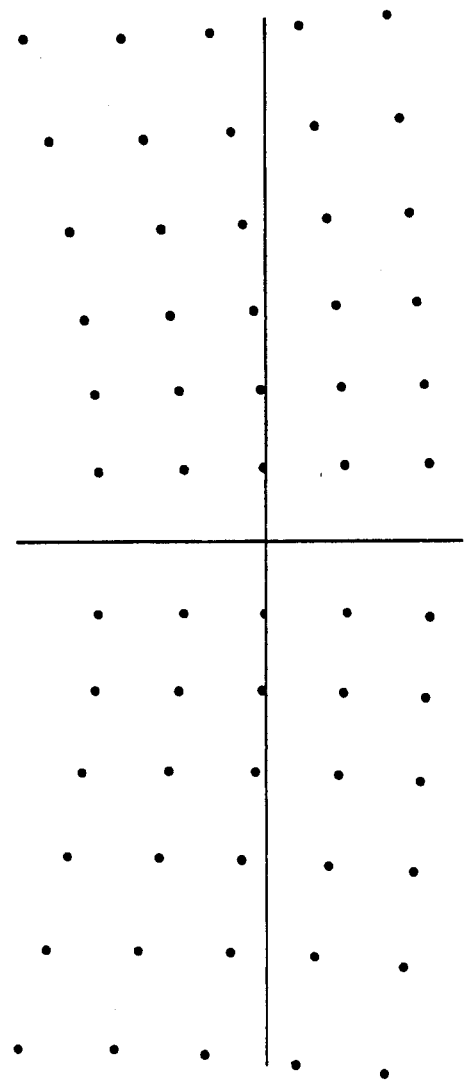
FIGS. 5 and 6 show two dispositions for correcting aberrations in the imaging device.
Figure 6:
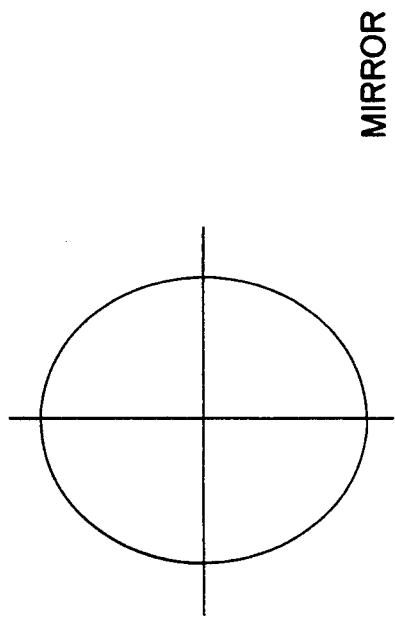

To ensure that the observer sees information properly, it may be appropriate to correct the distortion introduced by the mirror 100 directly on the imaging device 200. For example, FIG. 5 shows the deformation required of a rectangular grid on the imaging device 200 to obtain a correct virtual image. FIG. 6 shows the deformation required of a circle on the imaging device 200.

It will also be observed that, for the purpose of correcting aberrations introduced by the concave mirror 100, it is preferable for the imaging device 200 to be formed on a bulging surface rather than on a plane light-emitting surface.

Figure 7:
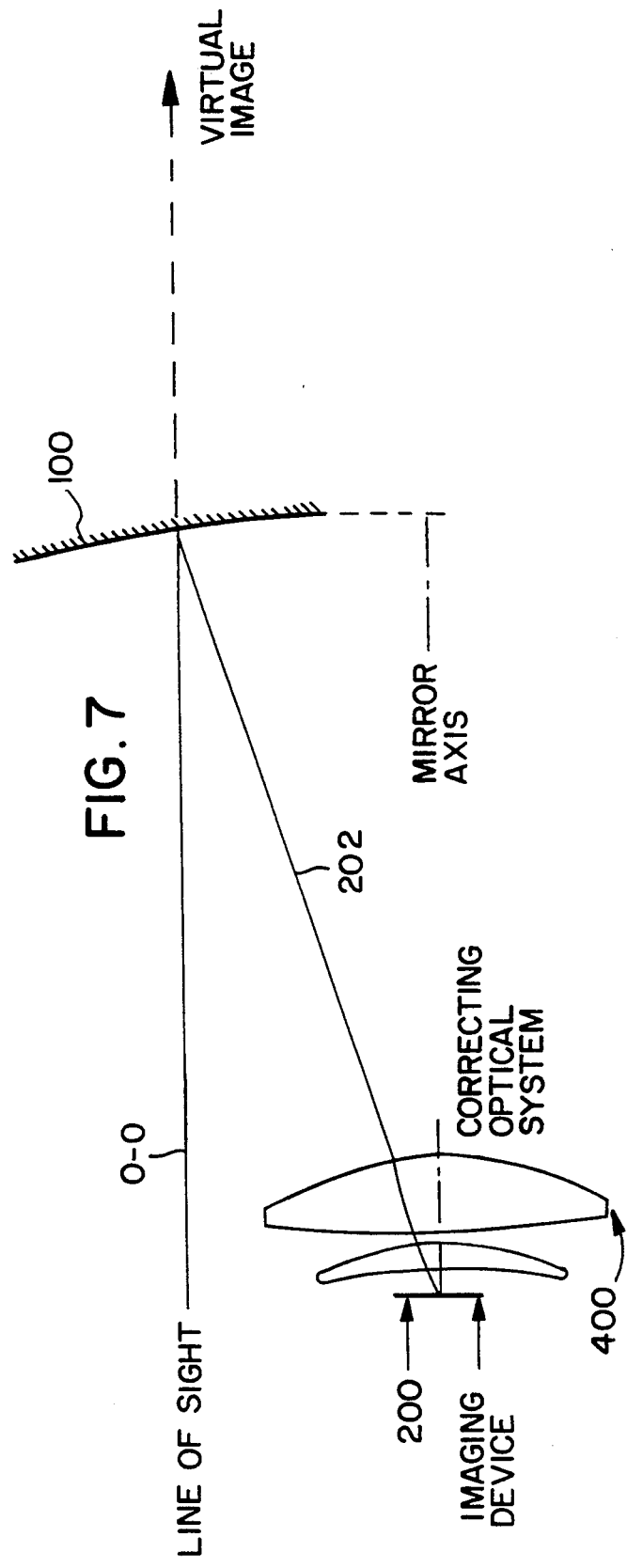
FIG. 7 is a diagrammatic vertical section through a variant embodiment of the device of the present invention fitted with a correcting optical system.

In yet another variant embodiment as shown in FIG. 7, it is possible to provide a correcting optical system 400 between the imaging device 200 and the concave mirror 100.

Figure 10:
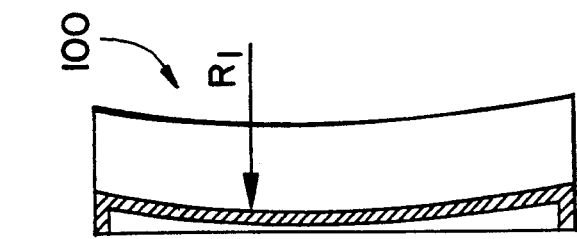
FIG. 10 is a diagrammatic vertical section view through the same mirror on a section plane reference X—X in FIG. 8.

As shown in FIGS. 8, 9 and 10, the concave mirror 100 in accordance with the present invention is delimited by a portion of the surface of a torus, i.e. the surface generated by a sector of a circle rotating about a straight line lying in the same plane as the circle but mot passing through the center of the circle.

As shown in FIG. 8, the toroidally-shaped mirror 100 preferably has a rectangular outline that is elongate in the horizontal direction. In the embodiment shown in FIGS. 8, 9, and 10, and given by way of nonlimiting example the mirror is thus delimited by a portion of the surface of a torus whose outline is rectangular, having a height of about 110 mm and a horizontal length of about 230 mm, the radius of curvature of the mirror in a horizontal section plane is about 352 mm, while the radius of curvature of the same mirror 100 in a vertical section plane is about 400 mm.

In other words, the surface of the mirror shown in FIGS. 8, 9 and 10 can be defined either by rotating the sector of a circle as shown in FIG. 10 (having a radius of about 400 mm) about a vertical axis lying in the vertical plane of symmetry of the mirror and at a distance of about 352 mm from the sector, or else by rotating the sector shown in the horizontal section plane of FIG. 9 (having a radius of about 352 mm) about a horizontal axis lying in the horizontal plane of symmetry of the mirror and at a distance of about 400 mm therefrom.

The concave mirror 100 may be made using any appropriate conventional technique. As an example, mention is made, by way of example, of making mirrors 100 by molding a body of plastic and then forming a reflecting coating thereon, e.g. by metallization. The plastic body of the mirror may be made of polymethylmethacrylate, for example.

Figure 11:
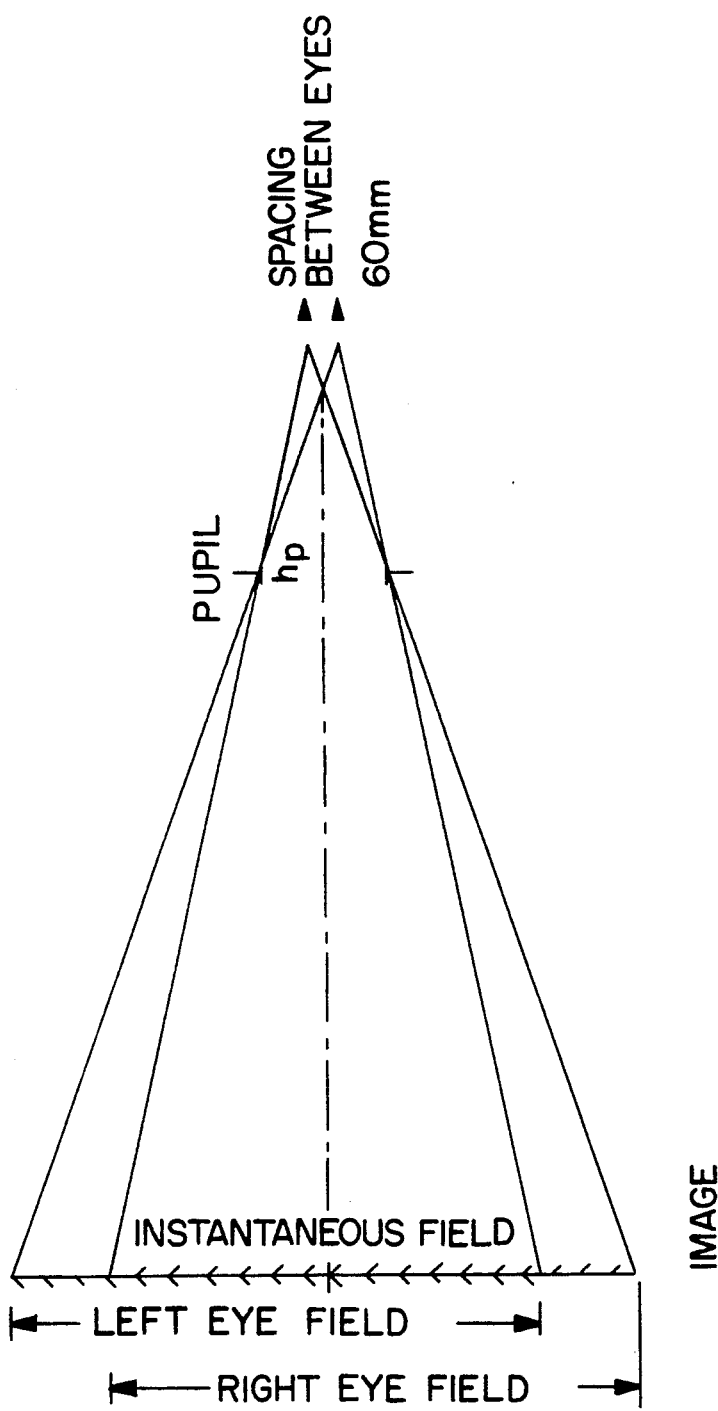
FIG. 11 is a diagrammatic horizontal view of the field of view of an observer.

Accompanying FIG. 11 shows the field of the right eye, the field of the left eye, and the instantaneous field of an observer which corresponds to the area that is covered simultaneously by the field of the right eye and by the field of the left eye. From FIG. 11, it will readily be understood that the instantaneous field of the virtual image as observed simultaneously by both eyes of an observer corresponds to a central region of about 70% only of the total field.

Figure 12:
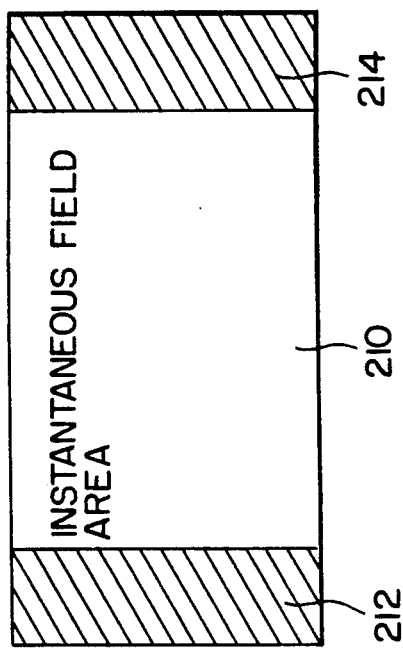
FIG. 12 is a diagrammatic front view of an imaging device in accordance with the present invention.

It is therefore advantageous, as shown diagrammatically in FIG. 12, to place the information that the observer needs to have available in the central region 210 of the imaging device that occupies about 70% of the horizontal length thereof, and to reserve the two side regions 212 and 214 each occupying about 15% for secondary information or for a background.

It is also possible for the concave mirror 100 to be semi-reflecting and to be associated with a second imaging device placed behind the mirror and facing towards the back of the vehicle. Such a disposition makes it possible to superpose a second type of image on the field of view of the observer. The image given by the second imaging device may be projected in the same plane as the virtual image of the imaging device 200 as given by the concave mirror 100. However this disposition is not essential.

The two imaging devices may be used simultaneously to superpose information. They may also be used in alternation. They may also be used with intermediate degrees of brightness.

For example, mention may be made of the possibility of using two displays to superpose complementary information, for example, one of the displays may display a dial while the other displays an associated pointer.

The imaging device 200 may be embodied in numerous different ways. For example, in addition to conventional imaging devices having a dial or a pointer, mention may be made of imaging devices of the LCD, VFT, CRT, and LED types, and also of any light-emitting surface type.

It may be observed that the person skilled in the art is capable, nowadays, of making liquid crystal displays that bulge on the basis of a support made of plastic. As mentioned above, this technique may be advantageous for completely correcting the aberrations introduced by the concave mirror 100.

It will also be observed that it is possible to add a plate of material, e.g. polymethylmethacrylate, in front of the imaging device 200 or between it and the concave mirror 100, with said plate being provided with indentations in its thickness, and being illuminated edge on. The front face of such a plate is preferably also given anti-reflection treatment. It serves to project various colors into the field of view or to define a frame for the virtual image without requiring the corresponding frame to appear on the imaging device 200 per se. This disposition is most advantageous insofar as it avoids making a frame on the imaging device itself, since providing such a frame outline puts a severe limit on other possibilities of making output connections.

It is also preferable for the optical device of the present invention to include means designed to avoid focusing ambient light, in particular glancing sunlight that could give rise to unwanted heating inside the vehicle.

In a first variant, these means may be constituted by an absorbent pane placed upstream from the concave mirror. It may be an LCD component that is opaque when at rest for the purpose of shutting out the rays of the sun, but that is transparent in operation.

It may also be constituted by an absorbent coating placed on the concave mirror 100. One possibility is to use a cold mirror such as the mirrors sold by the firm Melles Griot for selectively absorbing the rays of the sun.

According to another characteristic, the optical device of the present invention is provided with means for adjusting its angular position so as to enable the device to be adapted accurately to any driver regardless of size.

In a first variant, the concave mirror 100 and the imaging device 200 form a solid system and no relative displacement is possible between the mirror 100 and the imaging device 200. Under such circumstances, the system is advantageously capable of controlled rotation about a horizontal axis generally passing through the pupil of the observer.

In a second variant, only one of the components of the optical device, i.e. the mirror or the imaging device, need be movable to perform the adjustment.

Mention may also be made of the possibility of displaying information in different planes of the field of view by the means described and shown in patent application Ser. No. 88 15693 filed Nov. 30, 1988 by the present Applicant.

Figure 13:
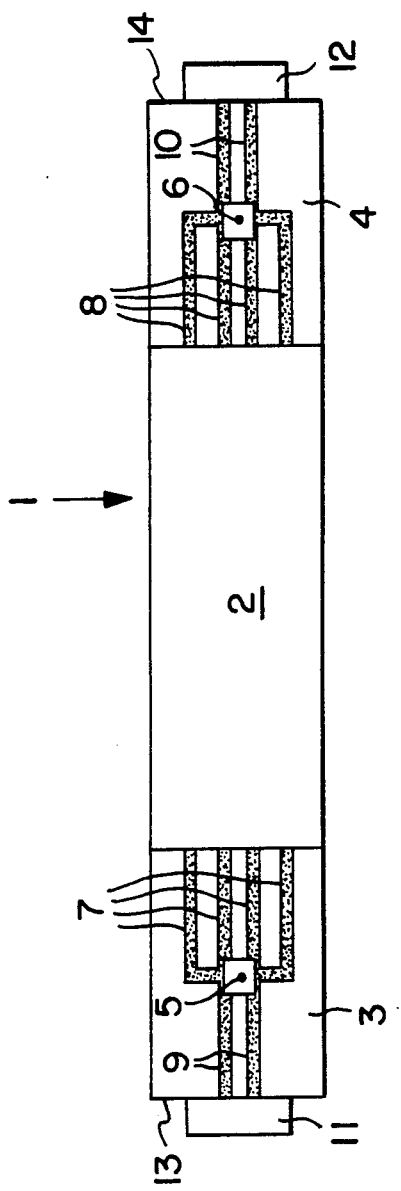
FIG. 13 is a diagram of one of the faces of a static display, e.g. of the LCD type, in accordance with a preferred embodiment of the present invention.

Accompanying FIG. 13 shows:

under reference 1, one of the glass plates of a display, e.g. of the LCD type;

under reference 2, the useful central area in which symbols to be displayed appear;

under references 3 and 4, side areas of the display located outside the useful central area 2;

under references 5 and 6, integrated circuits for driving the display and located on the side areas 3 and 4;

under references 7 and 8, electrically conductive tracks provided on the side areas 3 and 4 for connecting the integrated circuits 5 and 6 to control electrodes of the display; and under references 9 and 10, electrically conductive tracks provided on the side areas 3 and 4 for connecting the integrated circuits 5 and 6 to external connectors 11 and 12. These connectors are thus disposed on the vertical side edges 13 and 14 of the display.

The integrated circuits 5 and 6 are advantageously of the multiplexed control type so as to limit the number of conductors between the display and the information processing and control circuit.

In the context of the present invention, the static type display may advantageously be of the LCD type as mentioned above, or of the VFT type, the CRT type, the electrochemical type, or indeed any plane display known to the person skilled in the art.

Figure 14:
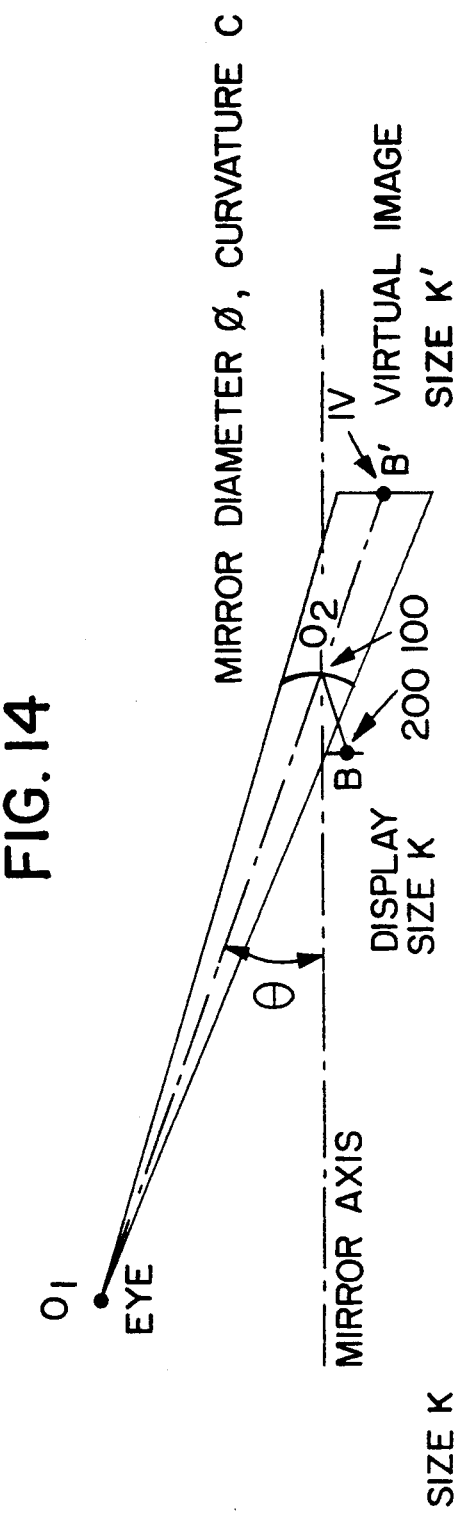
FIG. 14 is a vertical diagrammatic view of the essential components of an optical device in accordance with the present invention.

Accompanying FIG. 14 shows an optical device in accordance with the present invention that comprises a concave mirror 100 and an imaging device 200.

The concave face of the concave mirror 100 faces the observer, i.e. towards the back of the vehicle. In FIG. 14, the eye of the observer is referenced 01.

The imaging device 200 faces the mirror 100, i.e. towards the front of the vehicle. However, it may be observed that in a variant and described above, the imaging device may be placed behind the mirror 100.

In FIG. 14, reference IV designates the virtual image of the imaging device 200 as given by the mirror 100.

The tip of the mirror is referenced 02. The center of the display is referenced B. The center of the virtual image is referenced B'. The angle between the line of sight of the observer 01-02-B' and the axis of the mirror 100 is referenced $\theta$.

Different routes may be followed in designing the device as shown in FIG. 14.

In a preferred route, the procedure is as follows.

It begins by fixing the following values:

the position of the eye relative to the image;

the size of the virtual image IV;

the volume occupied by the assembly of the mirror 100 and the display 200; and the distance between the eye 01 and the mirror 100.

A necessary condition is added to the above, namely that the display must not lie in the field of view and it must be as close as possible to the axis of the mirror in order to limit the field.

Once these conditions are defined, the system is designed using the following equations:

$$p = |\overline{O1\ OQ}| \quad (1)$$

$$e = |\overline{O2\ B}| \quad (2)$$

$$e' = |\overline{O2\ B'}| \quad (3)$$

$$\sin\theta = \frac{k'p}{4(p+e')}\left(\frac{1}{e}+\frac{1}{e'}\right) \quad (4)$$

$$\phi = K'p/(p+e') \quad (5)$$

$$C = \frac{1}{2\cos\theta}\left(\frac{1}{e'}+\frac{1}{e}\right) \quad (6)$$

$$K = K'(e/e') \quad (7)$$

In the above equations, $\theta$ represents the angle between the axis of the mirror and the line of sight 01, O2 of the observer passing through the tip of the mirror, $\phi$ represents the diameter of the mirror, C represents the curvature of the mirror, and K and K' respectively represent the dimensions of the display and of the virtual image.

By way of example, for: p=800 mm, K'=120 mm, e=100 mm, and e'=200 mm the followings are obtained: $\phi$=96 mm, sin $\phi$=0.36 i.e. $\phi$=21.1°, K=60 mm.

The system obtained in this way generally suffers from aberrations. To correct it, certain parameters of the system can be varied (such as the curvature of the mirror, the extent to which it is aspherical, the distance between the display and the mirror, the slope of the display, etc...) so as to obtain an image of the display that is sharp and not deformed when the system is observed by the naked eye.

This can be done, for example, by setting out to obtain an aberration spot and deformation that are less than 18″, i.e. 0.08 mm at 1 m (the resolution of the eye for a trained observer).

It may be observed that the system does not have any chromatic aberration since it includes only one mirror.

In addition, since the pupil of the system is the eye (and thus small in size), aperture aberrations such as coma and spherical aberration are relatively minor.

However, given the relatively large fields (greater than 20° in the above example), curvature and distortion can take large values.

This can be remedied by acting on the shape of the mirror (by making it aspherical) and by optimizing other parameters such as the position and the curvature of the object, i.e. the display 200.

Nevertheless, the Applicant has determined that to simplify making the imaging device, it is possible to design it not as a curved component corresponding to the ideal curve obtained by the optimization process, but in the form of a polygonal component which is tangential to the resulting ideal curve.

To do this, once the geometry of the mirror has been optimized (spherical, paraboloidal, toroidal, aspherical, or other) to obtain minimum aberration, the positions of the planes of the polygon for obtaining minimum deformation are optimized as follows.

Figure 16B:
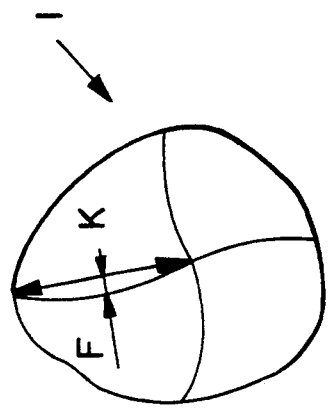
FIGS. 16A and 16B are diagrams showing a stage in the process of optimizing the device in accordance with the present invention.
Figure 16A:
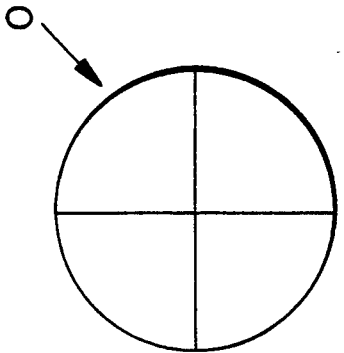

As shown in FIG. 16A, an object O represented by a circle and radii is placed in the plane of the polygon imaging device.

Calculations performed by known optical software give a resulting image I as shown in FIG. 16B when using the above-designed mirror 02.

For each of the radii in the image I, its chord K and its deflection F can be calculated.

For the set of radii R, K varies from a minimum value $K_m$ to a maximum value $K_M$ and the difference k between them is characteristic of the orientation of the plane of the display.

Similarly, the deflection F has a maximum value $F_M$ which is likewise characteristic of the orientation of the plane of the imaging device.

A function $A = \alpha k + \beta F_M$ (where $\alpha$ and $\beta$ are weights given to k and to $F_M$) is defined, and this function is minimized. The function A depends on the orientation of the object plane relative to the system.

Let $\gamma$ be the angle between the object plane O and a reference horizontal plane, and let $\delta$ be the angle between the object plane 0 and a reference vertical plane. The function A has a minimum as a function of $\gamma$ and a minimum as a function of $\delta$. These points are the optimum positioning values for each plane of the polygon display. The above-mentioned values $\gamma$ and $\delta$ can be obtained by successive iteration of software.

Naturally, other means can be used to optimize the values of the angles $\gamma$ and $\delta$.

As mentioned above, making a display in the form of various inclined plane components, i.e. in the form of a polygon, makes it possible to make the display very cheaply.

According to another advantageous characteristic of the invention at least one indicator device is provided in each plane of the display device.

In addition, the indicator devices are advantageously of the pointer type with the display carrying a dial whose graduations are uniformly distributed around a circle or a sector of a circle centered on the axis of rotation of the pointer.

The optimization process described above makes it possible to obtain a non-deformed image of the pointer, which image therefore remains equidistant from the graduations.

Figure 15:
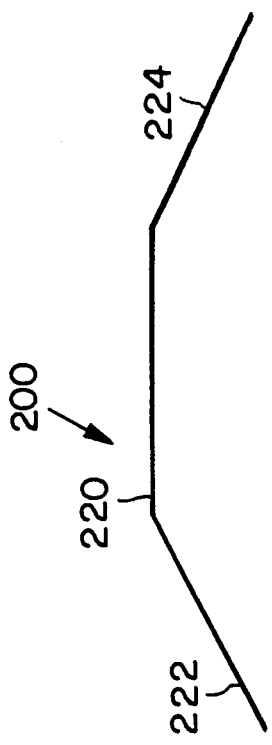
FIG. 15 is a diagrammatic plan of a display in accordance with the present invention.

As shown diagrammatically in the plane view of FIG. 15, the polygon imaging device is preferably symmetrical about the axis BO2 passing through the center of the display and the center of the mirror.

More precisely, as shown in FIG. 15, the imaging device 200 advantageously comprises three mutually inclined planes; a first plane 220 normal to the axis BO2, and two side planes 222 and 224 that are symmetrical about a vertical plane including the axis BO2 and that delimit a surface that is generally convex facing the concave mirror 100.

The optical device may be provided with means for adjusting its orientation to enable the device to be adapted accurately to a driver of any size.

To do this, the pointing system of the device may be controlled by motor-driven means under the control of a memory containing one or more reference values corresponding to the positions required by each driver so as to automate positioning of the device.

Such memory control means are known per se and are not described in detail below. They may be as described in the documents FR-A-2 585 200, FR-A-2 627 916, and FR-A-2 628 906.

According to another characteristic of the present invention, simpler means may be provided for pointing the device to the convenience of each driver.

To do this, the pointing means may comprise a knob or any equivalent means accessible on the outside of the dashboard for being operated by the user and connected to a pivot shaft for the device by drive means. Such drive means may be selected from the group comprising linkages, a belt, preferably a cog belt, a chain, gearing, or any equivalent means.

We claim:

1. An optical device for delivering information to the driver of a motor vehicle, the device comprising a concave mirror (100) placed below the bottom line of view in the landscape field of view, the concave side of the mirror facing the driver, and an imaging device (200) designed to direct a light signal towards the mirror (100), characterized by the fact that the concave mirror (100) is defined by a portion of the surface of a torus, and by the fact that the device includes means for adjusting its pointing direction about a horizontal axis.

2. An optical device according to claim 1, characterized by the fact that the imaging advice (200) and the concave mirror (100) form a rigid system without any possibility of relative displacement, and that this system is capable of rotating about the horizontal axis.

3. An optical device according to claim 1 or 2, characterized by the fact that the concave mirror (100) and the imaging device (200) form a solid system mounted on a support component to rotate about the horizontal axis, and that it includes motor driven means for controlling the pointing direction of the system in association with memory means that define at least one reference position as a function of the driver.

4. An optical device according to claim 1 or 2, characterized by the fact that the concave mirror (100) and the imaging device (200) form a solid system mounted on a support to rotate about the horizontal axis, and that manual control means are provided that are accessible on the vehicle dashboard and that are connected to a pivot shaft of the system via means selected from the group comprising: a linkage, a belt, a chain, or gearing.

5. An optical device according to claim 1, characterized by the fact that only one of the component parts of the optical device, i.e. only one of the concave mirror (100) and the imaging device (200), is rotatable about the horizontal axis.

6. An optical device according to claim 1, characterized by the fact that the imaging device (200) comprises a plurality of mutually inclined plane components (220, 222, 224) whose positions relative to the mirror (100) are optimized to generate an image that is free from deformation.

7. An optical device according to claim 6, characterized by the fact that the imaging device includes at least one indicator device on each plane component (220, 222, 224).

8. An optical device according to claim 7, characterized by the fact that at least one of the indicator devices provided on the imaging device (200) is an indicator device having a pointer.

9. An optical device according to claim 6, characterized by the fact that the various planes of the imaging device (200) define a convex envelope facing the concave mirror (100).

10. An optical device according to claim 6, characterized by the fact that the imaging device (200) comprises three mutually inclined plane components (220, 222, 224).

11. An optical device according to claim 10, characterized by the fact that the imaging device comprises a first plane component (220) normal to an axis (BO2) passing through the center of the imaging device (200) and the center of the mirror (100) and two lateral plane components (222, 224) that are symmetrical to each other about a vertical plane including said axis (BO2).

12. An optical device according to claim 1, characterized by the fact that the light signal from the imaging device (200) is directed towards the concave mirror (100) by an auxiliary return mirror (300).

13. An optical device according to claim 1, characterized by the fact that the concave mirror (100) has a radius of curvature of about 350 mm in a horizontal section plane and a radius of curvature of about 400 mm in a vertical section plane.

14. An optical device according to claim 1, characterized by the fact that useful information is contained in a central region (210) of the imaging device (200) occupying about 70% of its length.

15. An optical device according to claim 14, characterized by the fact that at least one integrated electronic circuit (5, 6) for driving the imaging device (200) is disposed on a side area (3, 4) of one of transparent members of the imaging device outside the central region (2) containing the symbols to be displayed.

16. An optical device according to claim 14, characterized by the fact that respective electronic circuits (5, 6) for driving the imaging device are disposed on each of side areas (3, 4) of one of transparent members of the display, outside the central region (2) showing symbols to be displayed.

17. An optical device according to claim 1, characterized by the fact that the concave mirror (100) is semi-reflecting and is provided with a second imaging device behind the concave mirror (100).

18. An optical device according to claim 1, characterized by the fact that a plate of transparent material is provided between the imaging device (200) and the concave mirror (100), the plate being provided with indenting in its thickness and being illuminated edge on.

19. An optical device according to claim 1, characterized by the fact that the concave mirror (100) is provided with a selectively absorbent coating.

20. An optical device according to claim 1, characterized by the fact that the imaging device (200) is of the static type and a connector (11, 12) is placed on one of vertical sides (13, 14) of the imaging device (200) to provide connections between the imaging device (200) and a power supply and information generating circuit.

21. An optical device according to claim 20, characterized by the fact that two connectors (11, 12) are placed on respective vertical sides (13, 14) of the imaging device (200) to provide connections between the imaging device (200) and a power supply and information-generating circuit.

* * * * *

UNITED STATES PATENT AND TRADEMARK OFFICE
CERTIFICATE OF CORRECTION

PATENT NO. : 5,291,338

DATED : March 1, 1994

INVENTOR(S) : Jean-Jacques BEZARD, et al

It is certified that error appears in the above-identified patent and that said Letters Patent is hereby corrected as shown below:

On the title page of the patent document, box [22], the PCT Filed Date should be -- June 15, 1990 --, not [Dec. 13, 1991].

Signed and Sealed this

Seventh Day of February, 1995

Attest:

BRUCE LEHMAN

Attesting Officer        Commissioner of Patents and Trademarks